(12) United States Patent
Kuo et al.

(10) Patent No.: US 6,451,926 B1
(45) Date of Patent: Sep. 17, 2002

(54) COATING COMPOSITIONS BASED ON POLYETHER ALCOHOLS PREPARED FROM 3,4-EPOXY-1-BUTENE

(75) Inventors: Thauming Kuo; Edward Enns McEntire; Stephen Neal Falling, all of Kingsport, TN (US); Yao-Ching Liu; William Anthony Slegeir, both of Longview, TX (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/564,860

(22) Filed: May 4, 2000

Related U.S. Application Data

(60) Provisional application No. 60/132,396, filed on May 4, 1999.

(51) Int. Cl.$^7$ ................................................ C08L 71/02
(52) U.S. Cl. ................. 525/403; 528/403; 528/408; 526/273; 549/512; 568/606; 525/404; 524/284; 524/800; 524/612
(58) Field of Search ................. 528/403, 408; 526/273; 549/512; 568/606; 525/403, 404; 524/612, 284, 800

(56) References Cited

U.S. PATENT DOCUMENTS

| | | | |
|---|---|---|---|
| 2,680,109 A | 6/1954 | Stevens et al. | 260/78.3 |
| 3,031,439 A | 4/1962 | Bailey, Jr. | 260/88.3 |
| 3,101,374 A * | 8/1963 | Patton | |
| 3,133,905 A | 5/1964 | Snyder et al. | 260/88.3 |
| 3,158,581 A | 11/1964 | Vandenberg | 260/2 |
| 3,158,591 A | 11/1964 | Vandenberg | 260/88.3 |
| 3,385,913 A | 5/1968 | Skrypa | |
| 3,398,126 A | 8/1968 | Skrypa | 260/78.5 |
| 3,417,064 A | 12/1968 | Bailey, Jr. | 260/79.5 |
| 3,468,847 A | 9/1969 | Doorenbos et al. | 260/63 |
| 3,509,118 A | 4/1970 | Vandenberg | 260/88.3 |
| 4,904,738 A | 2/1990 | Hardiman et al. | 525/306 |
| 5,010,154 A | 4/1991 | Hardiman | 526/135 |
| 5,015,613 A | 5/1991 | Hardiman et al. | 502/170 |
| 5,071,930 A | 12/1991 | Blevins et al. | 526/271 |
| 5,200,437 A | 4/1993 | Dougherty et al. | 522/89 |
| 5,227,533 A | 7/1993 | Plotkin et al. | 568/637 |
| 5,302,680 A | 4/1994 | Blevins et al. | 526/262 |
| 5,328,971 A | 7/1994 | Blevins et al. | 526/209 |
| 5,393,867 A | 2/1995 | Matayabas, Jr. et al. | 528/412 |
| 5,426,129 A | 6/1995 | Emmons et al. | 522/6 |
| 5,434,314 A | 7/1995 | Matayabas, Jr. et al. | 568/616 |
| 5,439,982 A | 8/1995 | Taylor et al. | 525/293 |
| 5,502,137 A | 3/1996 | Matayabas, Jr. et al. | 528/393 |
| 5,536,809 A | 7/1996 | Matayabas, Jr. et al. | 528/393 |
| 5,536,882 A | 7/1996 | Matayabas, Jr. et al. | 568/616 |
| 5,559,192 A | 9/1996 | Bors et al. | 525/300 |
| 5,608,034 A | 3/1997 | Falling et al. | 528/409 |
| 5,652,328 A | 7/1997 | Falling et al. | 528/409 |
| 5,849,812 A | 12/1998 | Zech et al. | 523/107 |

FOREIGN PATENT DOCUMENTS

| | | |
|---|---|---|
| DE | 2341873 | 2/1975 |
| FR | 1176297 | 4/1959 |
| FR | 1299848 | 12/1962 |
| GB | 1095937 | 12/1967 |

OTHER PUBLICATIONS

Jerome W. Knapczyk, "Polyallyl Glycidyl Ether Resins for Very Fast Curing High Performance Coatings," Journal of Coatings Technology, vol. 60, No. 756, pp. 63–72 (Jan. 1998).

Rokicki et al., "Unsaturated Polyester Resins with Different Allyl Ethers as Crosslinking Built–in Monomers", Journal of Applied Polymer Science, vol. 70, pp. 2031–2039 (1998).

Rokicki et al., "Water–Based Air–Drying Alkyd Polyester Resins Modified with Glycerol Allyl Ether", J.M.S. Pure Appl. Chem., A33(4) pp. 509–521 (1996).

* cited by examiner

*Primary Examiner*—Robert Dawson
*Assistant Examiner*—Kuo-Liang Peng
(74) *Attorney, Agent, or Firm*—Bernard J. Graves; Michael J. Blake

(57) ABSTRACT

EpB polyether alcohols were prepared by reacting 3,4-epoxy-1-butene with water or an alcohol such as methanol, butanol or ethylene glycol. Polyether alcohols thus prepared were found to have utility as reactive diluents for oxidatively curable coatings. In addition to this application, 3,4-epoxy-1-butene oligomers can also function as a resin, a chain extender, a monomer, and an additive for various oxidatively curable coating systems including alkyds, unsaturated polyesters, (meth)acrylate functional resins, urethanes, and latexes.

38 Claims, No Drawings

COATING COMPOSITIONS BASED ON POLYETHER ALCOHOLS PREPARED FROM 3,4-EPOXY-1-BUTENE

CROSS-REFERENCE TO RELATED APPLICATIONS

This application claims priority to U.S. provisional application No. 60/132,396, filed on May 4, 1999, which is incorporated herein by reference in its entirety.

FIELD OF THE INVENTION

This invention relates to oxidatively curable coating compositions containing polyether alcohols which are; the reaction product of 3,4-epoxy-1-butene and optionally a saturated oxirane, initiated with water or an alcohol. The invention also relates to oxidatively cured films formed from the coating compositions.

BACKGROUND OF THE INVENTION

Recently, intense research efforts in the coating industry have been directed to reducing volatile organic compounds (VOCs) in coating formulations due to environmental concern and governmental regulation. One of the emerging technologies developed for this purpose is to use reactive diluents in coating formulations. A typical reactive diluent has a viscosity which is low enough to enable it to function as an organic solvent although it remains in the films when the coatings are cured. In order to achieve that and achieve optimum coating properties, a reactive diluent needs to be a non-volatile liquid under the curing condition and should have a functionality which allows it to participate in the curing process. Accordingly, a non-volatile liquid at room temperature with allyl functionality would be desirable as a reactive diluent for oxidatively curable coatings.

In a paper presented at the 65th Annual Meeting of the Federation of Societies for Coatings Technology (October 1987) by J. W. Kilapczyk of Monsanto, and published in the *Journal of Coatings Technology*, vol. 60, no. 756, p. 63, 1988, it was reported that poly(allyl glycidyl ether) resins significantly accelerate the curing of thin acrylate and methacrylate films at low temperature in air and under practical anaerobic conditions.

In J.M.S.-*Pure Appl. Chem.*, A33 (4), p.509 (1996) it was reported that lacquers obtained from an alkyd resin containing 10–16 weight % of glycerol allyl ether exhibit short drying time, good hardness of coatings, and good water resistance. In *J. Appl. Polym. Sci.*, 70, 2031 (1998) it was also reported that high hardness of coatings cured in air using photoinitiators can be achieved for an unsaturated polyester resin with polyfunctional allyl ether monomers incorporated into polyester molecules as the end groups or as the pendant geminal groups.

Poly(allyl ethers) derived from polyols and carbohydrates, particularly allylated pentaerythritol, trimethylolpropane, and starches and sugars have been widely investigated as monomers suitable for protective coatings. These materials are attractive since they undergo autoxidative polymerization in contact with air. However, because of slow curing rates, color formation, high cost, and relatively poor substrate bonding strength, films of these allyl ethers have limited commercial use (see Allyl Compounds and Their Polymers by C. E. Schildknecht, Wiley Interscience, 1973).

Accordingly, it is an object of the present invention to overcome the above deficiencies and to provide oxidatively curable, low cost, allylic polyethers that are fast curing, have superior coating properties and which provide films having good hardness and high resistance to chemical attack.

SUMMARY OF THE INVENTION

The invention relates to oxidatively curable coating compositions containing an EpB polyether alcohol or a derivative thereof, which is a reaction product of 3,4-epoxy-1-butene and optionally a saturated oxirane compound, initiated with water or an alcohol. The coating compositions may contain other curable resins such that the EpB polyether alcohol functions as a reactive diluent. Alternatively, the EpB polyether alcohol can function as the main film-former in the oxidatively curable coating composition. The coating compositions containing EpB polyether alcohols cure oxidatively, preferably with commercially available metal driers.

The invention also relates to an EpB polyether alcohol or a derivative thereof, which is the reaction product of 3,4-epoxy-1-butene and a saturated oxirane compound, initiated with water or an alcohol. It is not necessary to react an alk-1-enyloxy oxirane such as those disclosed in U.S. Pat. No. 5,200,437 to Dougherty et al. to make the oxidatively curable EpB polyether alcohols of the invention. These alk-1-enyloxy oxiranes are costly and cannot be incorporated using acid catalysis due to the sensitivity of the vinyl ether group towards acid. These EpB polyether alcohols can function as reactive diluents in oxidatively curable coating compositions. In addition, these EpB polyether alcohols can function as a coating resin alone without other curable resins. The EpB polyether alcohols are also useful as surfactants, resins, chain extenders, monomers, or as an additive for various oxidatively curable coating systems including alkyds, unsaturated polyesters, acrylates, epoxies, urethanes, and latex polymers. The EpB polyether alcohols cure oxidatively, using commercially available metal driers.

One embodiment of the invention provides an oxidatively curable coating composition comprising (a) about 5–100 weight % of an oxidatively curable EpB polyether alcohol or a derivative thereof, (b) about 0–95 weight % of a curable resin, (c) about 0–40 weight % of an organic solvent, and (d) a catalytic amount of a metal drier. The EpB polyether alcohol is a reaction product of: (i) 3,4-epoxy-1-butene and (ii) an initiator selected which is water or an alcohol. The EpB polyether alcohol contains n units of residue (I) and m units of residue (II).

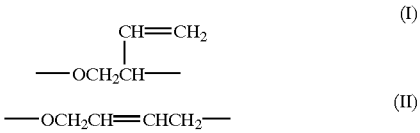

The sum of (n+m) is about 1 to 70 and the ratio of n/(n+m) is a value in the range of about 0.70 to 1.00.

In another embodiment of the invention, there is provided an EpB polyether alcohol which is a reaction product of: (a) 3,4-epoxy-1-butene, (b) a saturated oxirane compound; and (c) an initiator which is water or alcohol. The reactants used to make the EpB polyether alcohol which contains a saturated oxirane compound do not include an alk-1-enyloxy oxirane. The EpB polyether alcohol contains n units of residue (I) and m units of residue (II) shown above. The sum of n+m is about 2 to 70 and the ratio of n/(n+m) is a value in the range of about 0.70 to 0.95.

In a third embodiment of the invention, there is provided an oxidatively curable coating composition which contains:

(a) about 5–100 weight % of an oxidatively curable polyether alcohol or derivative thereof; (b) about 0–95 weight % of a curable resin; (c) about 0–40 weight % of an organic solvent; and (d) a catalytic amount of a metal drier. The EpB polyether alcohol is a reaction product of:(i) 3,4-epoxy-1-butene: (ii) a saturated oxirane compound and (iii) an initiator which is water or an alcohol. The polyether alcohol contains n units of residue (I) and m units of residue (II) as shown above, wherein the sum of n+m is about 1 to 70 and the ratio of n/(n+m) is a value in the range of about 0.70 to 1.00.

A fourth embodiment of the invention provides a polyether alcohol which is a block copolymer formed by reacting (i) 3,4-epoxy-1-butene, (ii) a saturated oxirane compound, and (iii) an initiator which is water or an alcohol, with the proviso that the reactants do not include an alk-1-enyloxy oxirane. The block copolymer contains n units of residue (I) and m units of residue (II) shown above, wherein the sum of n+m is a value in the range of about 1 to 70 and the ratio of n/(n+m) is a value in the range of about 0.70 to 1.00.

A fifth embodiment of the invention relates to an oxidatively cured film of the oxidatively curable coating composition containing an EpB polyether alcohol which is a reaction product of: 3,4-epoxy-1-butene and an initiator which is water or an alcohol as described above.

A sixth embodiment of the invention relates to an oxidatively cured film of the oxidatively curable coating composition containing an EpB polyether alcohol which is a reaction product of: 3,4-epoxy-1-butene, a saturated oxirane compound, and an initiator which is water or an alcohol as described above.

A seventh embodiment of the invention provides a composition comprising (a) an oxidatively curable EpB polyether alcohol which is a reaction product of 3,4-epoxy-1-butene and a saturated oxirane compound, initiated with water or an alcohol, with the proviso that the reactants do not include an alk-1-enyloxy oxirane described above, (b) a surfactant; and (c) water. The EpB polyether alcohol comprises n units of residue (I) and m units of residue (II) shown above, wherein the total value of n+m is about 2 to 70 and n/(n+m) is a value in the range of about 0.70 to 0.95.

DETAILED DESCRIPTION

As discussed above, one aspect of the invention relates to oxidatively curable coating compositions containing an EpB polyether alcohol or a derivative thereof, which is a reaction product of 3,4-epoxy-1-butene and optionally a saturated oxirane compound, initiated with water or an alcohol. The coating compositions may contain other curable resins such that the EpB polyether alcohol functions as a reactive diluent. Alternatively, the EpB polyether alcohol can function as the main film-former in the oxidatively curable coating composition. The coating compositions containing EpB polyether alcohols cure oxidatively, preferably with commercially available metal driers.

The EpB polyether alcohol which is a reaction product of 3,4-epoxy-1-butene and optionally a saturated oxirane compound, initiated with water or an alcohol, contains n units of residue (I) and m units of residue (II).

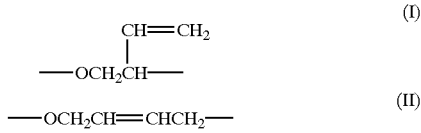

The sum of (n+m) in the EpB polyether alcohols is a value in the range of about 1 to 70 and n/(n+m) is a value in the range of about 0.70 to 1.00.

Advantageously, polyether alcohols which are the reaction product of 3,4-epoxy-1-butene and optionally a saturated oxirane compound, initiated with water or an alcohol can function as oxidatively curable coatings or as reactive diluents in oxidatively curable coatings. The phrase oxidatively curable refers to the ability of the polyether alcohols to cure in air, either at room temperature or at elevated temperatures, in the presence of metal driers. The phrase curable resin refers to a resin which is capable of being cured by any means, including but not limited to oxidatively curable resins.

The EpB polyether alcohols may be prepared by the polymerization of 3,4-epoxy-1-butene, and optionally a saturated oxirane compound, initiated with water or an alcohol. The alcohol which is used to initiate the polymerization may be selected from a vast number and broad variety of monohydric alcohols and polyhydric alcohols. Because the polyether alcohol grows from the hydroxyl group of the alcohol, ROH or polyol, $R(OH)_x$, where X is the number of hydroxyl groups, the "R" group may be the terminal residue of the alcohol. As discussed below this residue of the alcohol may be a major or minor component of the polyether alcohol.

Suitable monohydric alcohol initiators include low molecular weight organic alcohols and polymeric alcohols which may be linear or branched chain, aliphatic, alicyclic, or aromatic. Monohydric alcohol initiators preferably are selected from alkanols containing up to about 20 carbon atoms. When a monohydric alcohol, $R^4H$, is used as the initiator, the polyether alcohol product obtained has a primary hydroxyl group on one end of the polymer chain and thus is a polymeric alcohol. The other end of the polymer chain is terminated with the residue of the alcohol initiator, e.g., a residue having the formula —$R^4$ wherein $R^4$ is the residue of an alcohol, preferably an alkyl group, containing up to about 20 carbon atoms. Although secondary or tertiary alcohols may be used, primary alcohols are preferred. Some typically useful monohydric alcohol initiators include methanol, ethanol, n-butanol, isobutanol, 2-ethylhexanol, n-decanol, stearyl alcohol, cetyl alcohol, allyl alcohol, benzyl alcohol, methoxypolyethylene glycol, phenol, cresol and the like. Monohydric alcohols having from 1 to 20 carbon atoms are the preferred monohydric alcohols initiators. More preferred monhydric alcohols are those having from 1 to 12 carbon atoms.

Polyhydric alcohol initiators contain 2 or more hydroxyl groups and may be monomeric or polymeric compounds. Examples of the polyhydric alcohol initiators include ethylene glycol, 1,2-propanediol, 1,3-propanediol, 1,2-butanediol, 1,4-butanediol, 1,6-hexanediol, 1,4-cyclohexanediol, 1,4-cyclohexanedimethanol, 2,2-dimethyl-1,3-propanediol, 2,2,4-trimethyl-1,3-pentanediol, 2,2,4,4-tetramethyl-1,3-cyclobutanediol, 2-butene-1,4-diol, 1-butene-3,4-diol, hydroquinone, resorcinol, bis-phenol-A, glycerol, trimethylolpropane, starch, sucrose, glucose, pentaerythritol, polyethylene glycol, polypropylene glycol, polybutylene glycol, poly(tetramethylene ether)glycol, hydroxy-terminated poly(butadiene), hydroxy-terminated polyesters and hydroxy-terminated alkyds. When a polyhydric alcohol is used as the initiator, the polyether polymer typically grows from the hydroxy groups of the initiator and the subsequently obtained polyether is a polyether polyol. Diols having 2 to 6 carbon atoms constitute the preferred polyhydric alcohol initiators. Water may also be used as the initiator.

As mentioned above, the residues of the initiator compounds may constitute a minor or major portion of the molecular weight of the polyether alcohols of the invention. For example, if a polymeric initiator, e.g. a hydroxyl-terminated polyoxyalkylene polymer, is employed and the number of repeat units of 3,4-epoxy-1-butene residue is relatively low, the initiator residue content of the polyether alcohol may be greater than 90 weight percent. On the other hand, if the initiator employed is a low molecular weight compound such as methanol or water, the initiator residue may constitute as low as one weight percent or less of the polyether alcohol. The EpB polyether alcohols typically comprise at least 20 weight percent, preferably at least 30 weight percent, 3,4-epoxy-1-butene residues. When the polyether alcohol constitutes the main film-former of the coating composition, the ratio of 3,4-epoxy-1-butene to organic initiator used in the reaction is preferably higher thus producing a higher molecular weight, higher viscosity polyether alcohol. When the polyether alcohol is co-cured with another curable resin, the molar ratio of 3,4-epoxy-1-butene to organic initiator in the EpB polyether alcohol can be as low as about 1.0. Preferably the ratio of 3,4-epoxy-1-butene to initiator is from about 1 to about 70. More preferably the ratio is within the range of about 2–60 and most preferably it is within the range of from about 5–30.

The 3,4-epoxy-1-butene may be reacted with a saturated oxirane compound to dilute the 3,4-epoxy-1-butene in order to control the level of unsaturation of the EpB polyether alcohol. Thus another embodiment of the invention provides a polyether alcohol which is a reaction product of (i) 3,4-epoxy-1-butene, (ii) a saturated oxirane compound, and an (iii) an initiator selected from the group consisting of water and an alcohol. The EpB polyether alcohol comprises n units of residue (I) and m units of residue (II) shown above, wherein the sum of (n+m) in the EpB polyether alcohols is a value in the range of about 2 to 70 and n/(n+m) is a value in the range of about 0.70 to 0.95. These EpB polyether alcohols are also oxidatively curable and may be used in oxidatively curable coating compositions either as the main film-former or as a reactive diluent for another curable resin.

Accordingly, yet another embodiment of the invention provides an oxidatively curable coating composition which comprises about (a) 5–100 weight % of an EpB polyether alcohol which is the reaction product of 3,4-epoxy-1-butene, a saturated oxirane compound and optionally an initiator, (b) about 0–95 weight % of a curable resin, (c) about 0–40 weight % of an organic solvent, and (d) a catalytic amount of a metal drier.

Examples of saturated oxiranes which may be reacted with 3,4-epoxy-1-butene include, but are not limited to alkyl epoxides having from 2 to 26 carbon atoms such as ethylene oxide, propylene oxide, butylene oxide, butyl ethylene oxide, hexyl-ethylene oxide, tetramethyl-ethylene oxide, cyclohexene epoxide, 3,4-dichloro-1,2-epoxybutane, and 3,4-dibromo-1,2-epoxybutane. Additionally, styrene oxide, and glycidyl ethers such as bisphenol A diglycidyl ether, butyl glycidyl ether, phenyl glycidyl ether, benzyl glycidyl ether, glycidyl acetate, glycidyl propionate, glycidyl 2-ethylhexanoate, and glycidyl neodecanoate may also be used.

Preferably the molar ratio of the saturated oxirane compound to the 3,4-epoxy-1-butene is from about 0.05 to 10 and the molar ratio of the sum the moles of 3,4-epoxy-1-butene and saturated oxirane divided by the moles of initiator [(i+ii)/iii] is from about 1–30.

The 3,4-epoxy-1-butene may also be copolymerized with another unsaturated oxirane such as allyl glycidyl ether, isoprene monoepoxide, vinyl cyclohexene epoxide, limonene monoepoxide, 1,2-epoxy-5-hexene, etc.

To prepare the EpB polyether alcohols, 3,4-epoxy-1-butene is polymerized via a ring-opening reaction which may be initiated with water or an alcohol. The ring-opening reaction may be acid catalyzed as disclosed in U.S. Pat. Nos. 5,393,867, 5,434,314, and 5,536,882, all of which are incorporated by reference herein in their entirety. Alternatively, the polyether alcohols may be polymerized in the presence of a base catalyst as disclosed in U.S. Pat. No. 5,200,437, incorporated by reference herein in its entirety. As discussed above, the EpB polyether alcohols contain branched repeating units (I) as well as linear repeating units (II). These repeating units (I) and (II) result from the ring opening of the 3,4-epoxy-1-butene. The EpB polyether alcohols contain n units of (I) and m units of (II) which have the structures:

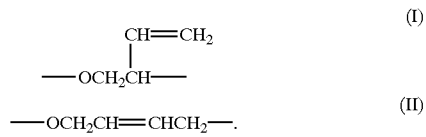

In the EpB polyether alcohols, the total value of (n+m) is 1 to 70 and n/(n+m) is a value in the range of about 0.70 to 1.00. Preferably, the sum of (n+m) is a value in the range of about 2 to 70 and the ratio of n/(n+m) is a value in the range of between about 0.70 to 0.95. Acid catalyzed reactions generally produce polyether alcohols with a higher ratio of residue (II) to residue (I) than base catalyzed reactions, generally in the range of 0.7 to 0.95. In general, base catalyzed reactions produce polyether alcohols with an n/(n+m) in the range of about 0.96–1.00. However, when an unsaturated alcohol such as 2-butene-1,4-diol, is used as the initiator, it is possible to get ratios of n/(n+m) of less than 0.96.

The acidic catalysts which may be used to prepare the EpB polyether alcohols include strong acids which are typically Bronsted acids such as sulfuric acid; perchloric acid; fluoroboric acid; strongly acidic ion exchange resins, e.g., Amberlyst® resins (sulfonated polystyrene); fluorosulfonic acids such as perfluoro-alkanesulfonic acids containing up to about 6 carbon atoms, e.g., trifluoromethanesulfonic acid, fluorosulfonic acid, and perfluorosulfonic acid polymers, e.g., Nafion® (Dupont) resins. The acid catalyst may also be a Lewis acid, such as boron trifluoride, boron trifluoride etherate, boron trifluoride tetrahydrofuran complex, aluminum chloride, zinc chloride, tin tetrachloride, etc. The preferred catalysts, are boron trifluoride etherate, and Nafion NR-50® perfluorosulfonic acidic resin, which has been cryogenically ground to 60 to 100 mesh (particles having an average diameter of 170 to 250 microns). The amount of the acidic catalyst which may be used can vary substantially depending, for example, on process conditions and the particular acid employed. For batch operations, the amount of catalyst used typically is in the range of about 0.5 to 20 mole percent based on the equivalents of initiator.

As mentioned above, the EpB polyether alcohols may also be prepared by a ring-opening reaction of the 3,4-epoxy-1-butene which is initiated with water or an alcohol and catalyzed by a base catalyst. Suitable base catalysts include, for example, sodium or potassium metal, sodium or potassium hydroxide, alkoxide, hydride, phenoxide, or an alkaline earth metal hydroxide or alkoxide. The catalyst is preferably employed in a concentration of between about 0.1 and about 5 wt. %, more preferably between about 0.4 and about 1 wt. %, based on total reactants.

The ring-opening reaction is typically conducted in the absence of solvent. However, in instances where the mixture of reactants provides a liquid having a viscosity such that good agitation becomes difficult, up to about 90 wt. % of an inert solvent may be added. Examples of such inert solvents for the acid-catalyzed polymerization include hydrocarbons, such as toluene, xylene isomers, benzene, and heptane; and chlorinated hydrocarbons, such as methylene chloride, chloroform, chlorobenzene and dichlorobenezene isomers. Examples of inert solvents which may be used for the base-catalyzed polymerization include hydrocarbons, such as toluene, xylene isomers, benzene, and heptane; chlorinated hydrocarbons, such as chlorobenzene and dichlorobenzene isomers; cyclic or acyclic ethers, such as methyl t-butyl ether, diethyl ether, dibutyl ether, diisopropyl ether, 1,2-dimethoxyethane, bis(2-methoxyethyl) ether, tetrahydrofuran, and amides such as N-methyl-pyrrolidone, N,N-dimethylformamide, N-ethyl-pyrrolidone; and nitrites such as benzonitrile.

The present reaction is effected in the liquid phase by agitating the reactants under a blanket of inert gas, e.g. nitrogen, argon, etc., at a temperature within the range of between about 40° C. to about 150° C., depending upon the choice of initiator, solvent, and catalyst, and under from about atmospheric pressure up to about 1,000 psi when volatile reactants or solvents are employed in the reaction mixture. The reaction takes place over a period of from about 1 to 48 hours. Preferred base-catalyzed conditions include a temperature of between about 100° C. and about 130° C. at slightly above atmospheric pressure for a period of from about 2 to 20 hours. Preferred acid-catalyzed conditions include a temperature of between about 30° C. and about 70° C. under atmospheric pressure for a period of from about 2 to 10 hours.

Examples of EpB polyether alcohol preparation are illustrated in the reaction schemes below. EpB polyether alcohol 1 was obtained by removing the low boilers from the reaction products of methanol and an excess of 3,4-epoxy-1-butene. EpB polyether alcohol 2 was obtained similarly from the reaction of 3,4-epoxy-1-butene and ethylene glycol, and it contained about 5 repeat units. EpB polyether alcohol 3 was also prepared from 3,4-epoxy-1-butene and ethylene glycol, but it contained about 8 repeat units. The polyether alcohols of the invention preferably contain from 1 to about 10 hydroxyl groups. Detailed descriptions of preparations of the EpB polyether alcohols are described in Examples 1–13 and 15 below. For clarity of illustration the figure depicts blocks of residues (II) and (II), however as discussed below, the EpB polyether alcohol has a random distribution of residues (I) and (II).

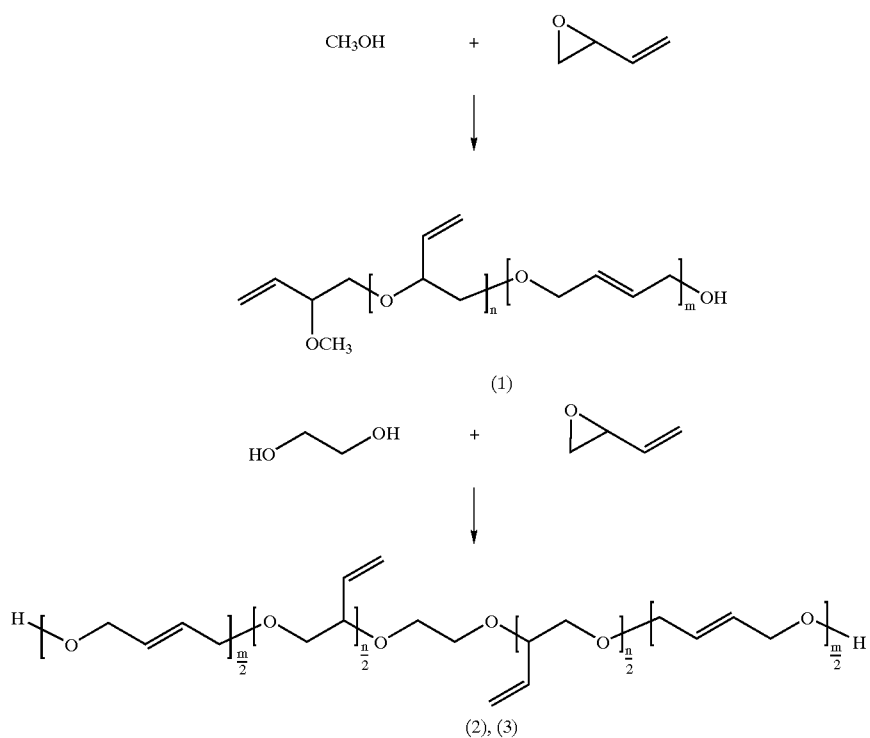

As mentioned above, the 3,4-epoxy-1-butene may be diluted by reacting it with a saturated oxirane compound and the initiator, to control the unsaturation of the EpB polyether alcohol. The reaction products may be random or block copolymers of the 3,4-epoxy-1-butene and the saturated oxirane compound. Examples of EpB polyether alcohol preparation via this route are illustrated in the reaction schemes below. Detailed descriptions of preparations of the EpB polyether alcohols containing a saturated oxirane are described in Examples 8 and 9 below. The EpB polyether alcohols produced by this reaction are also useful in oxidatively curable coating compositions.

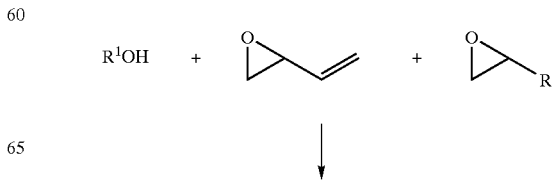

-continued

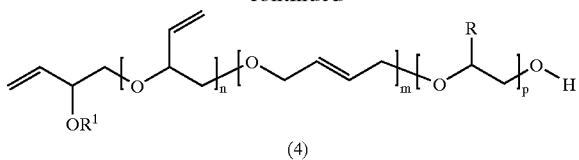

(4)

Where $R^1$ is the terminal residue of the alcohol or a hydrogen atom and R is a saturated hydrocarbon group.

Accordingly, another embodiment of the invention provides for an EpB polyether alcohol which is a block copolymer comprised of a reaction product of (a) 3,4-epoxy-1-butene, and (b) a saturated oxirane compound and (c) an initiator selected from the group consisting of water and an alcohol. In this embodiment, a saturated oxirane polymer such as polyethylene glycol may function as the initiator, see e.g., Example 9. The EpB polyether alcohol comprises n units of residue (I) and m units of residue (II) having the structures:

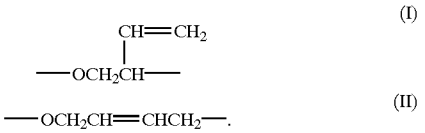

wherein the total value of (n+m) is 1 to 70 and n/(n+m) is a value in the range of 0.70 to 1.00. These EpB polyether alcohols can be block or random copolymers of the 3,4-epoxy-1-butene and the saturated oxirane. The block copolymers of 3,4-epoxy-1-butene and ethylene oxide are particularly useful as surfactants in, for example, oxidatively curable coating compositions as they are water-soluble but still retain their oxidative curing property.

As discussed above a coating composition of the invention may contain about (a) 5–100 weight % of the oxidatively curable EpB polyether alcohol, (b) about 0–95 weight % of a curable resin, (c) about 0–40 weight % of an organic solvent and (d) a catalytic amount of a metal drier. More preferably, the composition comprises about 10–50 weight % of the polyether alcohol (a), about 50–80 weight % of the curable resin (b) and about 0–30 weight % of the organic solvent (c). Most preferably the composition comprises about 15–30 weight % of the polyether alcohol (a), about 60–75 weight % of the curable resin (b), and about 0–20 weight % of the organic solvent (c).

The curable resins (b) useful in the oxidatively curable coating compositions are those which are oxidatively curable themselves and those which are co-curable oxidatively with the polyether alcohol. Preferably the curable resin (b) contains carbon-carbon-unsaturation. Examples of suitable curable resins containing carbon-carbon unsaturation include acrylamide functional resins, alkyd resins, unsaturated epoxy resins, unsaturated urethane resins, unsaturated polyester resins, modified polyester resins containing unsaturation, polybutadiene resins, acrylate functional oligomers, e.g., pentaerythritol triacrylate, trimethylolpropane triacrylate, ethoxylated trimethylolpropane triacrylate esters and diethylene glycol diacrylate, acrylate functional polymers, and acrylic latex resins. Other suitable unsaturation sites on the curable resins include maleate, fumarate, and itaconate esters and acid esters.

For example, EpB polyether alcohols may be mixed or otherwise combined with acrylic latexes which have been functionalized with groups that are radically polymerizable, such as allyl ester, allyl ether, acrylate ester, methacrylate ester, methacrylamide, terminal olefin, maleate ester, and the like. The latexes may also contain groups that promote chain transfer and grafting such as acetoacetate esters and their enamine reaction products with amines, mercaptans, substituted alcohol or ether groups (such as polymer-OCH—(CH$_3$)$_2$ or polymer-OCH$_2$CH(CH$_3$)OH). These materials (functional latex and EpB polyether alcohol) may be combined, optionally with the aid of a surfactant, to form stable blends which form films on evaporation of water and/or solvents. The films cure oxidatively and are solvent resistant due to the cross-linking which occurs during curing.

The organic solvents (c) which may be used in the oxidatively curable coating compositions include inert solvents such as hydrocarbons, chlorinated hydrocarbons, cyclic or acyclic ethers, alcohols, esters, ketones, glycol ethers and acetates and the like. Examples of such solvents include mineral spirits, hetane, hexane, benzene, toluene, xylene isomers, methylene chloride, chloroform, tetrahydrofuran, methoxypropanol, butoxyethanol, hexyl ether of diethylene glycol, Texanol®, methyl n-amyl ketone, methyl isobutyl ketone, n-butyl acetate, isopropyl acetate, n-butanol, 2-butanol, 2-ethylhexanol, propylene glycol monomethyl ether, propylene glycol monobutyl ether, ethylene glycol monobutyl ether and the like.

Metal driers may be used to accelerate the curing process. The drier may be any polyvalent metal-containing complex or salt which catalyzes the oxidative curing of the coating composition. Examples of metal driers (d) which may be used include metal carboxylates which are the reaction products of metals and organic acids. Such metals include cobalt, zirconium, calcium, manganese, rare earth metals, e.g., lanthanum and cerium, aluminum, zinc, iron and mixtures thereof. Preferred driers are mixtures of the Zirconium Hexcem®, Cobalt HydrocureII®, Cobalt Hexcem® and Calcium Hydrocem® driers which are available from OMG America, Cleveland, Ohio. The drier is typically present in an amount of about 1.0 to about 5% metal content by weight of the coating composition.

According to the invention, EpB polyether alcohols may also be copolymerized with a low molecular weight compound to provide EpB polyether alcohol derivatives with enhanced film-forming properties and increased molecular weight while still retaining oxidative curing properties. For example, EpB polyether alcohol may be reacted with di-isocyanates to provide polymers which cure oxidatively, and add additional coating properties such as flexibility, hardness and solvent resistance that are contributed by the resulting urethane functionality and increased molecular weight. Additional low molecular weight compounds which may be reacted with the EpB polyether alcohols include di-epoxides, tri-epoxides, di-esters, carbonates, mono-isocyanates, polyisocyanates, and the like. Since the EpB polyether alcohols may have from 1 to about 10 hydroxyl groups per molecule, one skilled in the art may manipulate these EpB polyether alcohols to produce useful polymers of increased molecular weight without producing a significant gel content which would be less useful for coatings.

The oxidatively curable coatings may contain one or more conventional additives. Such additives include but are not limited to, leveling, rheology, and flow control agents such as silicones, fluorocarbons, urethanes, or cellulosics; extenders; reactive coalescing aids such as those described in U.S. Pat. No. 5,349,026; flatting agents; pigment wetting and dispersing agents and surfactants; ultra-violet (UV) absorbers; WV light stabilizers; tinting pigments; extenders;

defoaming and antifoaming agents; anti-settling, anti-sag and bodying agents; anti-skinning agents; anti-flooding and anti-floating agents, fungicides and mildewcides; corrosion inhibitors; thickening agents; plasticizers; reactive plasticizers; curing agents; or coalescing agents. Specific examples of such additives may be found in *Raw Materials Index*, published by the National Paint & Coatings Association, 1500 Rhode Island Avenue, NW, Washington, D.C. 20005.

The oxidatively curable coatings of the invention are useful in a variety of coating compositions such as architectural coatings, maintenance coatings, industrial coatings, automotive coatings, textile coatings, inks, adhesives, and coatings for glass, metal, paper, wood, and plastics. The coating compositions may be clear or pigmented.

The coating composition of the invention may be applied to a variety of surfaces, substrates, or articles, e.g., paper, plastic, steel, aluminum or other metals, wood, gypsum board, galvanized sheeting (either primed or unprimed), concrete, nonwoven or woven fabrics, glass, ceramics, glazed or unglazed tiles, plaster, stucco and roofing substrates such as asphaltic coatings, roofing felts, synthetic polymer membranes, and foamed polyurethane insulation; or to previously painted, primed or undercoated, worn or weathered substrates.

The coating compositions of the invention may be applied to appropriate substrates as thin films by a variety of techniques known in the art. For example, a coating composition may be applied by roll coating, dip coating, spray coating, e.g., by air-assisted spray or airless spray, trowels, paint brush, flexographic, lithographic and offset-web printing processes or the like.

In general, the films may be cured by heating, e.g., in an air oven or by IR lamps, or by air drying. Exposing the film to a temperature of up to about 150° C., preferably to a temperature of between about 50 to 120° C., accelerates the curing time. Advantageously, the films cure to form a hard, solvent resistant coating. Accordingly, another embodiment of the invention relates to a cured film of the EpB polyether alcohol coating composition.

This invention can be further illustrated by the following examples of preferred embodiments thereof, although it will be understood that these examples are included merely for purposes of illustration and are not intended to limit the scope of the invention unless otherwise specifically indicated.

EXAMPLES

Example 1

Oligomerization of 3,4-epoxy-1-butene Initiated with Water

A 300-mL, three-neck, round-bottom flask equipped with a magnetic stirrer, thermocouple, condenser, addition funnel and heating mantle was purged with nitrogen then charged with 0.52 grams of Amberlyst DPT-1® acidic catalyst (sulfonated polystyrene from Rohm and Haas Co.) and 100 mL (5.56 moles) of distilled water. The mixture was heated to 50° C. then 350 mL (305 g, 4.35 moles) of 3,4-epoxy-1-butene was added over about four hours at 50–63° C. The reaction mixture was heated at 75° C. overnight. The reaction mixture was filtered through paper. About 0.5 mL of saturated, aqueous sodium carbonate was added then low boilers were removed by rotary evaporation. The resulting mixture was vacuum distilled through a Vigreux column at 3 mm to give: fraction 1, 25–80° C., 118.31 g; fraction 2, 80–112° C., 29.4 g; fraction 3, 112–126° C., 67.2 g; fraction 4, 126–153° C., 72.0 g; fraction 5, 153–183, 30.2 g. Analysis by gas chromatography showed that fraction 1 was 99.9% 1,2-dihydroxy-3-butene. Fraction 2 was 64.5% 1,2-dihydroxy-3-butene, 10.5% 1,4-dihydroxy-2-butene, and 24.7% dimeric isomers (i.e., the product of one molecule of water with two of 3,4-epoxy-1-butene). Fraction 3 was 7.6% 1,4-dihydroxy-2-butene and 90.4% dimers and 1.7% trimers. Fraction 4 was 67.4% dimers and 32.4% trimers. Fraction 5 was 2.66% dimers, 68.8% trimers and 28.5% tetramers.

Example 2

Oligomerization of 3,4-epoxy-1-butene Initiated with Methanol

A 500-mL, three-neck, round-bottom flask equipped with a magnetic stirrer, thermocouple, condenser, addition funnel and heating mantle was purged with nitrogen then charged with 0.57 grams of Amberlyst DPT-1® acidic catalyst and 100 mL (79.2 g, 3.28 moles) of methanol. The mixture was heated to 61° C. then 237 mL (206 g, 2.94 moles) of 3,4-epoxy-1-butene was added over 60 minutes at 57–61° C. After eight days at 60° C. the mixture was filtered through Celiteo filter aid then low boilers were removed by rotary evaporation. The colorless liquid (124.99 g) was vacuum distilled through a Vigreux column at 1.8 mm to give: fraction 1, 25–68° C., 49.32 g; fraction 2, 68–75° C., 28.6 g; fraction 3, 75–111° C., 7.63 g; fraction 4, 111–130° C., 8.63 g. Fraction 1 was 92.8% 2-methoxy-3-buten-1-ol. Fraction 2 was 90.2% dimeric isomers (i.e., the product of one molecule of methanol with two of 3,4-epoxy-1-butene). Fraction 3 was 77.3% dimers and 22.4% trimers, and fraction 4 was 8.61% dimers, 84.6% trimers and 6.47 tetramers.

Example 3

Oligomerization of 3,4-epoxy-1-butene Initiated with 1-butanol

A 500-mL, three-neck, round-bottom flask equipped with a magnetic stirrer, thermocouple, condenser, addition funnel and heating mantle was purged with nitrogen then charged with 0.53 grams of Amberlyst DPT-1® acidic catalyst and 100 mL (81.0 g, 1.09 moles) of 1-butanol. The mixture was heated to 70° C. then 200 mL (206 g, 2.94 moles) of 3,4-epoxy-1-butene was added over 30 minutes at 70° C. After five days at 70° C. about 0.1 g of p-toluenesulfonic acid was added to the mixture. Heating was continued for a total of 14 days. After cooling the mixture, about 0.2 g of sodium bicarbonate was added then it was filtered through Celite®. Low boilers were removed by rotary evaporation. The resulting liquid was vacuum distilled through a Vigreux column at 0.8 mm to give: fraction 1, 25–70° C.; fraction 2, 70–72° C.; fraction 3, 72–104° C.; fraction 4, 104° C. Fraction 1 was mostly 1-butanol, fraction 2 was 84.9% 2-butoxy-3-buten-1-ol, fraction 3 was mostly dimers and fraction 4 was mostly dimers and trimers.

Example 4

Polyether 1. Polymerization of 3,4-epoxy-1-butene Initiated with Methanol

A 3000-mL, three-neck, round-bottom flask equipped with a magnetic stirrer, thermocouple, condenser, addition funnel and cooling/heating bath was purged with nitrogen then charged with 220 mL (174 g, 5.43 mole) of methanol and 0.5 mL of concentrated sulfuric acid. To the stirred mixture was added 1000 mL (870 g, 12.4 moles) of 3,4-epoxy-1-butene over 4.5 hours. During addition, the temperature was allowed to rise from room temperature then it was held at 85–111° C. The mixture was allowed to cool overnight. Four grams of sodium bicarbonate was added to the reaction mixture and it was stirred for three hours. The reaction flask was equipped with a distillation head, and heating mantle. The mixture was heated under vacuum to strip out low boilers (at up to 128° C. and 10 mm). The cooled distillation residue was treated with 7.0 g of decolorizing charcoal then filtered through Celite® to give 647.5 g of an amber liquid. Analysis by gel permeation chromatography (GPC, THF solvent, polystyrene equivalent molecular weight) showed $M_p=302$, $M_n=308$, $M_w=373$. Analysis by nuclear magnetic resonance (NMR, $CDCl_3$ solvent) showed a n/(n+m) ratio of 0.82.

Example 5

Polyether 2. Polymerization of 3,4-epoxy-1-butene Initiated with Ethylene Glycol A 3000-mL, four-neck, round-bottom flask equipped with a mechanical stirrer, thermocouple, condenser, and addition funnel was purged with nitrogen then charged with 62.12 g of ethylene glycol (1.001 mole) and 0.5 mL of concentrated sulfuric acid. To the rapidly stirred mixture was added 810 mL (705 g, 10.1 moles) of 3,4-epoxy-1-butene over 100 minutes. During addition, the temperature was allowed to rise from room temperature then it was held at 74–83° C. The mixture was allowed to cool overnight then it was transferred to a 2000-mL, three-neck, round bottom flask equipped with a distillation head, magnetic stirrer, thermocouple and heating mantle. After adding 4.0 g of sodium bicarbonate, the mixture was heated under vacuum to strip out low boilers (at up to 136° C. and 7 mm). The cooled distillation residue was treated with 5.5 g of decolorizing charcoal then filtered through Celite® to give 426.5 g of an amber liquid. Analysis by GPC (THF, polystyrene equivalent molecular weight) showed $M_p=566$, $M_n=492$, $M_w=710$. Analysis by NMR ($CDCl_3$) showed a n/(n+m) ratio of 0.82.

Example 6

Polyether 3 Polymerization of 3,4-epoxy-1-butene Initiated with Ethylene Glycol

A 3000-mL, four-neck, round-bottom flask equipped with a mechanical stirrer, thermocouple, condenser, and addition funnel was purged with nitrogen then charged with 62.15 g of ethylene glycol (1.001 mole) and 0.5 mL of concentrated sulfuric acid. To the rapidly stirred mixture was added 810 mL (705 g, 10.1 moles) of 3,4-epoxy-1-butene over 4.5 hours. During addition, the temperature was allowed to rise from room temperature then it was held at 83–96° C. The mixture was held at 87° C. overnight then it was cooled to 50° C. and transferred to a 2000-mL, three-neck, round bottom flask equipped with a distillation head, magnetic stirrer, thermocouple and heating mantle. After adding 4.0 g of sodium bicarbonate, the mixture was heated under vacuum to strip out low boilers (at up to 143° C. and 1 mm). The cooled distillation residue was treated with 4.4 g of decolorizing charcoal then filtered through Celite® to give 651.0 g of an amber liquid. Analysis by GPC (THF, polystyrene equivalent molecular weight) showed $M_p=997$, $M_n=906$, $M_w=1417$. Analysis by NMR ($CDCl_3$) showed a n/(n+m) ratio of 0.80.

Example 7

Polymerization of 3,4-epoxy-1-butene Initiated with Ethylene Glycol

A 3000-mL, four-neck, round-bottom flask equipped with a mechanical stirrer, thermocouple, condenser, and addition funnel was purged with nitrogen then charged with 62.55 g of ethylene glycol (1.008 mole) and 7.46 g of boron trifluoride etherate. To the rapidly stirred mixture was added 810 mL (705 g, 10.1 moles) of 3,4-epoxy-1-butene over three hours. During addition, the temperature was allowed to rise from room temperature then it was held at 51–59° C. (initially with air cooling then with a heating mantle). The mixture was held at 55° C. for two hours then cooled to 40° C. Fifty milliliters of 1 M aqueous sodium hydroxide was added to neutralize the catalyst. After a few minutes of stirring, 400 mL of diethyl ether and 100 mL of saturated, aqueous sodium chloride was added. The layers were separated and the organic layer was washed with five 100 mL portions of water (until neutral). The solution was transferred to a 2000-mL, three-neck, round-bottom flask equipped with a distillation head, magnetic stirrer, thermocouple and heating mantle and heated under vacuum to strip out low boilers (at up to 161° C. and 2.9 mm). The light yellow distillation residue weighed 606.9 g (theory 767.3 g, 79.1%). Analysis by GPC (THF, polystyrene equivalent molecular weight) showed $M_p=866$, $M_n=835$, $M_w=1309$. Analysis by NMR ($CDCl_3$) showed a n/(n+m) ratio of 0.92.

Example 8

Co-polymerization of 3,4-epoxy-1-butene and Propylene Oxide Initiated with Ethylene Glycol to Form a Random Copolymer of 3,4-epoxy-1-butene and Propylene Oxide A 2000-mL, four-neck, round-bottom flask equipped with a mechanical stirrer, thermocouple, Dry-Ice condenser, and addition funnel was purged with nitrogen then charged with 62.1 g of ethylene glycol (1.00 mole) and 8.2 g of boron trifluoride etherate. To the rapidly stirred mixture was added a mixture of 347.3 g (4.96 moles) of 3,4-epoxy-I-butene and 255.2 g (4.39 moles) of propylene oxide over seven hours. During addition, the temperature was allowed to rise from room temperature then it was held at 47–54° C. After addition, the mixture was stirred at 50° C. for 1.5 hours. Thirty-four grams of sodium bicarbonate was added to the reaction mixture then 5 mL of water. This slurry was stirred overnight at 50° C. then filtered through Celite® to give a light yellow liquid. The liquid was transferred to a 2000-mL, three-neck, round bottom flask equipped with a distillation head, magnetic stirrer, thermocouple and heating mantle and heated under vacuum to strip out low boilers (at up to 140° C. and 1.7 mm). The light yellow distillation residue weighed 587.1 g. Analysis by GPC (THF, polystyrene equivalent molecular weight) showed $M_p=908$, $M_n=827$, $M_w=1183$. Analysis by NMR (acetone-$d_6$) showed a n/(n+m) ratio of 0.90 and an incorporated 3,4-epoxy-1-butene to propylene oxide ratio of 1.1 to 1.

Example 9

Polymerization of 3,4-epoxy-1-butene Initiated with poly(ethylene glycol)-400 to Form a Block Copolymer of 3,4-epoxy-1-butene and PEG A 2000-mL, four-neck, round-bottom flask equipped with a mechanical stirrer, thermocouple, condenser, and addition funnel was purged with nitrogen then charged with 400 g of poly(ethylene glycol) ($M_n=400$) and 7.1 g of boron trifluoride etherate. To the rapidly stirred mixture was added 653 g (9.31 moles) of 3,4-epoxy-1-butene over 7.5 hours. During addition, the temperature was allowed to rise from room temperature then it was held at 39–42° C. After addition, the mixture was stirred at room temperature overnight. Thirtyone grams of sodium bicarbonate was added to the reaction mixture then 5 mL of water. This slurry was stirred 3.5 hours then heated to 40° C. and filtered through Celite® to give a light yellow liquid. The liquid was transferred to a 2000-mL, three-neck, round bottom flask equipped with a distillation head, magnetic stirrer, thermocouple, and heating mantle and heated under vacuum with nitrogen bubbling into the liquid to strip out low boilers (at up to 130° C. and 1.2 mm). The light yellow distillation residue weighed 913.8 g. Analysis by GPC (THF, polystyrene equivalent molecular weight) showed $M_p$=998, $M_n$=854, $M_w$=1592. Analysis by NMR (acetone-$d_6$) showed a n/(n+m) ratio of 0.86.

Example 10

Polymerization of 3,4-epoxy-1-butene Initiated with 1,4-butanediol

A 2000-mL, four-neck, round-bottom flask equipped with a mechanical stirrer, thermocouple, condenser, and addition funnel was purged with nitrogen then charged with 45.06 g of 1,4-butanediol (0.500 mole) and 7.6 g of boron trifluoride etherate. To the rapidly stirred mixture was added 3,4-epoxy-1-butene slowly from the addition funnel. During addition, the temperature was allowed to rise from room temperature then it was held at 39–42° C. After 500 g of 3,4-epoxy-1-butene had been added, the addition was briefly stopped to add another 3.6 g of boron trifluoride etherate (dissolved in 3.6 g of tetrahydrofuran) to the mixture. A total of 653 g (9.31 moles) of 3,4-epoxy-1-butene was added over nine hours. The mixture was stirred at room temperature overnight. Forty-three grams of sodium bicarbonate was added to the reaction mixture then 8 mL of water. This slurry was stirred three hours then filtered through a steam-heated filter funnel containing Celite® to give a light yellow liquid. The liquid was transferred to a 2000-mL, three-neck, round bottom flask equipped with a distillation head, magnetic stirrer, thermocouple, and heating mantle and heated under vacuum with nitrogen bubbling into the liquid to strip out low boilers (at up to 130° C. and 1.3 mm). The light yellow distillation residue weighed 626.6 g. Analysis by GPC (THF, polystyrene equivalent molecular weight) showed $M_p$=1828, $M_n$=1450, $M_w$=2697. Analysis by NMR (acetone-$d_6$) showed a n/(n+m) ratio of 0.94 and $M_n$=1192. Brookfield viscosity was 1062 cP at 24° C.

Example 11

Polymerization of 3.4-epoxy-1-butene Initiated with Isopropyl Alcohol

A 2000-mL, four-neck, round-bottom flask equipped with a mechanical stirrer, thermocouple, condenser, and addition funnel was purged with nitrogen then charged with 60.1 g of isopropyl alcohol (1.00 mole) and 7.5 g of boron trifluoride etherate. To the rapidly stirred mixture was added 3,4-epoxy-1-butene slowly from the addition funnel. During addition, the temperature was allowed to rise from room temperature then it was held at 36–54° C. After 522 g of 3,4-epoxy-1-butene had been added, the addition was briefly stopped to add another 2.0 g of boron trifluoride etherate (dissolved in 2.0 g of tetrahydrofuran) to the mixture. After 592 g of 3,4-epoxy-1-butene had been added, the addition was briefly stopped to add another 4.0 g of boron trifluoride etherate (dissolved in 4.0 g of tetrahydrofuran) to the mixture. A total of 653 g (9.31 moles) of 3,4-epoxy-1-butene was added over eight hours. The mixture was stirred at room temperature overnight. Forty-two grams of sodium bicarbonate was added to the reaction mixture then 9.3 mL of water. This slurry was stirred three hours then filtered through a steam-heated filter funnel containing Celite® to give a light yellow liquid. The liquid was fed to a wiped-film evaporator to strip out low boilers (129–149° C. jacket temperature and 2.6–4.4 mm). The light yellow distillation residue weighed 557.8 g. Analysis by GPC (THF, polystyrene equivalent molecular weight) showed $M_p$=992, $M_n$=695, $M_w$=1128. Analysis by NMR (acetone-$d_6$) showed a n/(n+m) ratio of 0.95 and $M_n$=733. Brookfield viscosity was 188 cP at 24° C.

Example 12

Polymerization of 3,4-epoxy-1-butene Initiated with 2-ethylhexanol

A 3000-mL, four-neck, round-bottom flask equipped with a mechanical stirrer, thermocouple, condenser, and addition funnel was purged with nitrogen then charged with 262 g of 2-ethylhexanol (2.01 moles) and 7.5 g (approximate dry weight) of Nafion NR50® acidic resin (wet and swollen with 2-ethylhexanol (recovered from a previous polymerization)). To the rapidly slurry was added 3,4-epoxy-1-butene slowly from the addition funnel. During addition, the temperature was allowed to rise from room temperature then it was held at 46–56° C. A total of 653 g (9.31 moles) of 3,4-epoxy-1-butene was added over three hours. The mixture was stirred at 54–56° C. for 80 minutes then allowed to cool overnight. The mixture was filtered through paper to recover the catalyst. The filtrate was treated with about two grams of decolorizing charcoal and two grams of calcium oxide. The re-filtered material was transferred to a 2000-mL, three-neck, round bottom flask equipped with a distillation head, magnetic stirrer, thermocouple, and heating mantle and heated under vacuum with nitrogen bubbling into the liquid to strip out low boilers (at up to 110° C. and 3 mm). The orange distillation residue weighed 712 g. Analysis by GPC (THF, polystyrene equivalent molecular weight) showed $M_p$=555, $M_n$=560, $M_w$=1149. Analysis by NMR (acetone-$d_6$) showed a n/((n+m)) ratio of 0.84. Brookfield viscosity was 51.6 cP at 24° C.

Example 13

Polymerization of 3,4-epoxy-1-butene Initiated with Ethylene Glycol

A 5000-mL, four-neck, jacketed, round-bottom flask equipped with a mechanical stirrer, thermocouple, distillation head, heating/cooling circulating bath, and liquid feed pump was purged with nitrogen then charged with 124.2 g of ethylene glycol (2.00 mole) and 16.5 g (0.12 mole) of boron trifluoride etherate. To the rapidly stirred mixture was added 3,4-epoxy-1-butene via feed pump. During the addition, the temperature was allowed to rise from room temperature then it was held at 36–41° C. A total of 1402 g (20.0 moles) of 3,4-epoxy-1-butene was added over six hours. The mixture was stirred at room temperature overnight. Steam was blown into the mixture while heating to distill low boilers. The steam supply was removed and the distillation continued at a pressure of about 200 mm until most of the water was removed. The mixture was cooled to about 70° C. then 20 g of calcium oxide was added and the slurry allowed to cool overnight. The slurry was filtered through Celite® using a steam-jacketed filter funnel to give a light amber liquid. This liquid was stripped of low boilers by passage through a wiped-film evaporator at 137° C. and 1.6 mm. The EpB polyether polyol was the non-volatile fraction (1238 g). Analysis by GPC (THF, polystyrene equivalent molecular weight) showed $M_p$=939, $M_n$=725, $M_w$=1070. Analysis by NMR (acetone-$d_6$) showed a n/(n+m) ratio of 0.90. Brookfield viscosity was 271 cP at 24° C.

Example 14

Acetoacetylation of EpB Polyether Polyol

A 500-mL, three-neck, round-bottom flask equipped with a magnetic stirrer, heating mantle, thermocouple, Vigreux column and distillation head was purged with nitrogen then charged with 100.0 g of the ethylene glycol-initiated EpB polyether polyol of example 13, 100 mL of p-xylene and 60 g (0.38 mole) of t-butyl acetoacetate. The mixture was heated to distill off t-butanol and p-xylene over 2.5 hours at up to 182° C. pot temperature and 131° C. head temperature. The mixture was cooled to 91° C. then heated under vacuum with nitrogen bubbling into the liquid to strip out low boilers (at up to 120° C. and 7 mm). The pot residue was filtered to remove stopcock grease to give 114.5 g of acetoacetylated EpB polyether polyol as a light amber liquid. Analysis by GPC (THF, polystyrene equivalent molecular weight) showed $M_p$=1149, $M_n$=761, $M_w$=1384. Analysis by NMR (acetone-$d_6$) showed a n/((n+m)) ratio of 0.91. Brookfield viscosity was 196 cP at 20 24° C.

Example 15

Base-catalyzed Polymerization of 3,4-epoxy-1-butene Initiated with 1,4-butanediol Starter preparation. A 3000-mL, four-neck, round-bottom flask equipped with a mechanical stirrer, thermocouple, distillation head, and addition funnel was purged with nitrogen then charged with 2500 g of 1,4-butanediol (27.74 mole) and a solution of 95.98 g of 85% potassium hydroxide in 91.5 g of water. The mixture was heated to 95° C. then held at this temperature for two hours. The reaction mixture was placed under vacuum (1.5 mm) at 95° C. with nitrogen bubbling into the liquid to strip out low boilers (114.2 g). The resulting solution (2452.0 g) was transferred and stored under nitrogen in a glass container. This solution of the potassium salt of 1,4-butanediol was used as starter for base-catalyzed polymerizations of 3,4-epoxy-1-butene as described in the following typical example. Polymerization. A one-gallon autoclave equipped with a mechanical stirrer, thermocouple, cooling coil, and addition port was purged with nitrogen then charged with 600.05 g of the potassium salt of 1,4-butanediol in 1,4-butanediol. The autoclave was heated to 110° C. then 2600 grams of 3,4-epoxy-1-butene was added through the addition port at a feed rate that kept the reactor temperature between 110° C. and 115° C. (pressure 5 to 40 psig). It took about six hours to perform the addition. After addition the mixture was held at this temperature for two more hours. The autoclave was purged vigorously with nitrogen through a dip tube in the autoclave at 110° C. for 0.5 hour then placed under vacuum (0.5 mm) with nitrogen bubbling into the liquid to strip out low boilers at 110° C. for 0.5 hour. The autoclave was brought to one atmosphere with nitrogen, cooled to 95° C. then 120 g of Magnesol® (synthetic magnesium silicate), 40 g of Celite® filter aid, and 50 g of de-ionized water were added under nitrogen. The autoclave was heated to 110° C. and held for two hours. The autoclave was placed under vacuum (0.5 mm) with nitrogen bubbling into the liquid at 110° C. for one hour to remove water. The reaction mixture was filtered under nitrogen pressure (20 to 50 psig) through Celite® affording 2908 g of a light yellow liquid. Analysis by GPC (THF, polystyrene equivalent molecular weight) showed $M_p$=747, $M_n$=538, $M_w$=690. Analysis by NMR (acetone-$d_6$) showed a n/((n+m)) ratio of 1.0 and $M_n$=492.

Example 16

Preparation of Alkyd Resin

To a three-neck, round-bottom flask equipped with a mechanical stirrer, a steam-jacketed partial condenser, a Dean-Stark trap, a nitrogen inlet, and a water condenser were charged neopentyl glycol (NPG), 53.89 g (0.52 mole); trimethylolpropane (TMP), 139.37 g (1.04 mole); isophthalic acid (IPA), 201.82 g (1.22 mole); benzoic acid (BA), 30.37 g (0.25 mole); and Fascat 4100® (Atochem), 0.32 g. The mixture was allowed to react at 180° C.–220° C. until 47.0 g of the condensate (water) was obtained. After the mixture was cooled, Pamolyn 200® (Hercules), 209.06 g (0.72 mole), and Fascat 4100®, 0.32 g, were then added. The reaction was allowed to continue at 190–220° C. until an acid number of 3.2 mg KOH/g was obtained. The resulting resin was allowed to cool to 120° C. and xylene (140.8 g) added to yield a resin solution with 80% non-volatiles.

Example 17

Coating Formulation

The coating formulations shown in Table 1 below, were prepared by mixing the alkyd resin prepared from Example 16 with EpB polyether alcohols as prepared in Examples 4, 5, and 6 in the presence of driers (Co and Zr) and a flow control agent FC-430® (3M). A control formulation D without EpB polyether alcohols was also prepared for comparison. The drier blend was prepared by mixing Zirconium Hex-Cem® (18% Zr, available from OMG America, Cleveland, Ohio), 1.67 g, cobalt (6% Co, available from Tenneco), 2.78 g, and methyl amyl ketone (MAK), 1.26 g.

TABLE 1

| Fomulation | A | B | C | D |
| --- | --- | --- | --- | --- |
| Alkyd (80% N.V. in xylene) | 5.25 g | 5.25 g | 5.25 g | 5.25 g |
| Polyether 1 | 1.80 g | — | — | — |
| Polyether 2 | — | 1.80 g | — | — |
| Polyether 3 | — | — | 1.80 g | — |
| Xylene | 0.83 g | 0.83 g | 0.83 g | 2.63 g |
| Driers (48.86% N.V. in MAK) | 0.20 g | 0.20 g | 0.20 g | 0.20 g |
| FC-430 (20% in isopropanol) | 0.04 g | 0.04 g | 0.04 g | 0.04 g |

Example 18

Determination of Formulation Weight Loss During Drying

A small portion (0.3–1.0 g) of the above coating formulations was poured into an aluminum pan. The formulation was allowed to spread out to form a film which was left to air dry at room temperature. The weight loss of the film was determined over a period of several days. It was found that the films lost most of their volatiles (xylene) during the first few hours of drying. After four days at room temperature, no significant weight loss of the polyether alcohols was observed. The films were then baked at 80° C. for 16 hr. Only the one containing polyether alcohol 1 showed a significant weight loss of about 26% of the polyether alcohol.

Example 19

Determination of Oxygen Consumption During Curing

The oxygen consumption of the above coating formulations during drying was determined by the Micro-Oxymax instrument (Columbus Instruments, Columbus, Ohio). The Micro-Oxymax instrument is a closed-circuit respirator used to measure minute amounts of oxygen consumed by a sample. Samples with the size of 4 in.×0.75 in. were prepared by applying various formulations on Leneta papers (3 mil wet thickness). After flashing at room temperature for 30 min., the samples were then placed in the Micro-Oxymax chambers for the measurement of oxygen consumption over time. Results from the Micro-Oxymax study showed that the formulations with EpB polyether alcohols generally consumed greater than twice the amount of oxygen as compared to the formulations without EpB polyether alcohols (control formulation D). This result indicates that EpB polyether alcohols of the present invention could participate in the oxidative curing process of alkyd coatings.

Example 20 (Comparative)

Determination of Oxygen Consumption of Coating Formulations Prepared from EpB Polyether and Santolink XI-100

The EpB polyether prepared in Example 7 was utilized to compare its oxygen consumption with a commercial poly (allyl glycidyl ether), Santolink XI-100® from Solutia Co. Two coating formulations (E and F) were prepared according to Table 1 by replacing polyether 1 in formulation A with the EpB polyether of Example 7 and Santolink XI-100® respectively. Oxygen consumption of these two samples was then determined according to the method described in Example 19. As shown in the following data, formulation E prepared from the EpB polyether of Example 7 had a higher oxygen uptake over time than formulation F prepared from Santolink XI-100®.

TABLE 2

Oxygen Consumption (μl) Determined by Micro-Oxymax

| | 10 hours | 20 hours | 40 hours | 80 hours | 120 hours |
|---|---|---|---|---|---|
| Formulation E | 1933 | 2453 | 3070 | 3628 | 3827 |
| Formulation F | 1482 | 1795 | 2270 | 2898 | 3173 |

Example 21

Various Coating Formulations Based on Isopropanol Initiated 3,4-Epoxy-1-butene Polyether The formulations in Table 3 below were prepared with various ratios of alkyd and polyether (i.e. 60/40, 50/50, and 40/60) by using the alkyd resin from Example 16 and the isopropanol initiated 3,4-epoxy-1-butene polyether from Example 11. The formulations were prepared similarly as described in Example 17. The resulting formulations all had a suitable viscosity for coating application.

TABLE 3

| Formulation | I | II | III |
|---|---|---|---|
| Alkyd (80% N.V. in xylene) | 10.50 g | 10.50 g | 10.50 g |
| Example 11 Polyether | 5.60 g | 8.40 g | 12.60 g |
| Xylene | 1.00 g | 0.50 g | — |
| Driers (48.86% N.V. in MAK) | 0.47 g | 0.56 g | 0.70 g |
| FC-430 (20% in isopropanol) | 0.04 g | 0.04 g | 0.04 g |

Example 22

Preparation of Maleic Anhydride Modified Polyester Resin

To a three-neck, round-bottom flask equipped with a mechanical stirrer, a steam-jacked partial condenser, a Dean-Stark trap, a nitrogen inlet, and a water condenser were charged neopentyl glycol (NPG), 152.47 g (1.47 mole); trimethylolpropane (TMP), 12.08 g (0.09 mole); isophthalic acid (IPA), 93.81 g (0.57 mole); adipic acid (AD), 82.52 g (0.57 mole); and Fascat 4100® (Atochem), 0.35 g. The mixture was allowed to react at 170–210° C. until 40 g of the condensate (water) was obtained. After the mixture was cooled to 150° C., maleic anhydride (MA), 40.52 g (0.41 mole), was added. The reaction was allowed to continue at 150° C. until an acid number of 33.6 mg KOHg was obtained. The resulting resin was allowed to cool to 100° C. and xylene (81.0 g) added to yield a resin solution with 80% non-volatiles.

Example 23

Coating Formulations Based on Maleic Anhydride Modified Polyester and Ethylene Glycol Initiated 3,4-Epoxy-1-butene Polyether The formulations shown in Table 4 below were prepared by using the maleic anhydride modified polyester from Example 22 and the ethylene glycol initiated EpB polyether from Example 7. It was found that coatings thus prepared exhibited excellent solvent resistance (MEK double rubs, 150–200) after baking at 80° C. for 15 hours.

TABLE 4

| Formulation | I | II |
|---|---|---|
| Modified Polyester (80% N.V. in xylene) | 10.50 g | 10.50 g |
| Example 7 Polyether | 3.60 g | 8.40 g |
| Xylene | 1.66 g | 0.50 g |
| Driers (48.86% N.V. in MAK) | 0.40 g | 0.56 g |
| FC-430 (20% in isopropanol) | 0.04 g | 0.04 g |

Example 24

This example shows the oxidative cure of the neat 3,4-epoxy-1-butene polyethers with and without catalyst. Each polyether in Table 5 below was optionally catalyzed by stirring in 2% of Cobalt HydrocureII® (5% Co) catalyst and 4% of Calcium Hydrocem® (5% Ca), both available from OMG Americas, Cleveland, Ohio. Films were made by drawdown (wet film thickness=3 mils) onto steel panels (Bonderite 1000 pretreatment (R-36-I Panels available from Q-Panel Laboratory Products)), then the resulting films were baked and tested for cure by observation and acetone double rubs. The uncatalyzed films failed acetone rubs (the films were immediately soluble in acetone and were removed from the panel) whereas the catalyzed films had solvent resistance as measured by rubbing with an acetone soaked rag back and forth at constant pressure.

TABLE 5

| Resin Tested | Catalyzed | Acetone Double Rubs | Bake Conditions |
|---|---|---|---|
| Example 3 Polyether | No | sl. tacky | 1 hr./100° C. |
| Example 1 Polyether | No | wet | 1 hr./100° C. |
| Example 3 Polyether | Yes | 50 | 1 hr./100° C. |
| Example 1 Polyether | Yes | 46–100* | 1 hr./100° C. |

*Failed at 46 rubs in wrinkled area, passed 100 in thin area.

Example 25

This example illustrates the cure of the polyethers compared to a commercially available poly(allyl glycidyl ether).

Catalyst levels were the same as for the previous example. Two different cobalt catalyst sources were used. Films were made by drawdown (wet film thickness=2 mils) onto steel panels (Bonderite 1000 pretreatment (R-36-I Panels available from Q-Panel Laboratory Products)). The data shown in Table 6 below indicate that the polyether of Example 7 cures more slowly at ambient temperature than poly(allyl glycidyl ether), but cures comparably at elevated temperature even though its molecular weight is lower.

TABLE 6

| Resin Tested* | Catalyzed | Acetone Double Rubs | Bake Conditions | Polyether Mw |
|---|---|---|---|---|
| Example 7 Polyether | Yes# | 100+ | 2 hr/100° C. | 1309 |
| Example 7 Polyether | Yes* | 100+ | 2 hr/100° C. | 1309 |
| Santolink XI-100 ®^ | Yes* | 100+ | 2 hr/100° C. | 1792 |
| Example 7 Polyether | Yes* | wet | RT 17 hrs | 1309 |
| Santolink XI-100 ®^ | Yes* | dry, hard | RT 17 hrs | 1792 |

^Poly(allyl glycidyl ether) from Solutia.
Catalyzed with Cobalt Hydrocure II ® and Calcium Hydrocem ® at 2 and 4%, respectively.
*Catalyzed with Cobalt Hexcem ® (5% Co, available from OMG Americas, Cleveland, OH) and Calcium Hydrocem ® at 2 and 4%, respectively.

Example 26

This example illustrates the effective cure of the polyethers over different substrate metals. Films were made by drawdown (wet film thickness=2 mils). The data in Table 7 below, indicate that at lower bake times, the uncatalyzed Santolink XI-100® does not cure as well as the polyether of this invention.

TABLE 7

| Resin Tested$ | Catalyzed | Substrate& | Acetone Double Rubs | Bake Conditions |
|---|---|---|---|---|
| Example 7 Polyether | Yes# | B-1000 | 100+ | 1 hr/100° C. |
| Example 7 Polyether | Yes* | B-1000 | 100+ | 1 hr/100° C. |
| Santolink XI-100 ® | Yes* | B-1000 | 90 | 1 hr/100° C. |
| Example 7 Polyether | No | B-1000 | 70 | 1 hr/100° C. |
| Santolink XI-100 ® | No | B-1000 | 5 | 1 hr/100° C. |
| Example 7 Polyether | No | Aluminum | 50 | 1 hr/100° C. |
| Example 7 Polyether | Yes# | Aluminum | 100+ | 1 hr/100° C. |
| Example 7 Polyether | Yes* | Aluminum | 100+ | 1 hr/100° C. |

$Catalyzed resins were aged overnight before application.
Catalyzed with Cobalt Hydrocure II ® (0.1% Co) and Calcium Hydrocem ® (0.2% Ca)
*Catalyzed with Cobalt Hexcem ® (0.1% Co) and Calcium Hydrocem ® (0.2% Ca)

Example 27

This example illustrates the formation and use of a urethane-containing polymer which is cured oxidatively to form a coating with excellent solvent resistance. The polyether of Example 7 (65.45 g ), prepared from ethylene glycol plus 10 moles of 3,4-epoxy-1-butene having a Mw of 1309 was reacted with 13.10 g Desmodur W® Isocyanate (available from Bayer) in 62.8 g of toluene as solvent. Then 0.079 g of dibutyltin dilaurate (available from Aldrich #29,123–4) was added. After 40 minutes, the temperature had increased from 23 to 28° C. Slowly the temperature was raised by heating to 90° C. over 1 hour. After 2 hours of heating at 90° C., no isocyanate was detected by infra-red analysis of the reactor contents. Analysis by gel permeation chromatography using polystyrene standards in THF solvent showed that the polymer product had a Mw of 5550. Therefore the molecular weight of the polymer was increased significantly over the original molecular weight of the polyether.

Cure: To 10 grams of the product above was added 0.202 g Cobalt Hydrocure II® (OMG Corp.) and 0.406 g Calcium Hydrocem® (OMG Corp.). A film was prepared by drawdown bar designed to produce a wet film of 4 mils thickness. After a flash dry of 30 minutes, the 4×8 inch steel panel substrate (with Bonderite® 1000 surface treatment) supporting the film was baked for 1 hour at 100° C. The resultant film was evaluated for cure using a MEK double rub technique, whereby a cloth saturated with MEK was rubbed back and forth across the film at a constant pressure. As shown in Table 8 below, the film passed 270 double rubs with no trace of film degradation except at pinholes (no marring at the rub path). By comparison, a film from the starting polyether (no urethane) prepared and cured in the same manner as above did not perform as well. It passed only 250 double rubs, also failing at pinholes, and the film was significantly marred in the rub path.

Therefore the higher molecular weight urethane polymer was superior in solvent resistance to the original polyether.

TABLE 8

| Coating Material | Cured Film Properties | Cured Film Thickness (micrometers) | MEK Double Rubs | Film Appearance after MEK Rubs |
|---|---|---|---|---|
| Urethane Product of Example 22 | Hard, glossy | 15 | 270 | Pinhole defects, no marring |
| Example 7 Polyether | Hard, glossy | 22 | 250 | Pinhole defects, significant marring |

Example 28

This example illustrates the production of a low molecular weight urethane oligomer from 2-methoxy-3-buten-1-ol. To a flask equipped with a stirrer, nitrogen atmosphere, and thermometer were charged 40 grams of 2-methoxy-3-buten-1-ol and 0.013 g of dibutyltin dilaurate. The flask contents were heated to 90° C., then 159.0 g of Desmondur Z 4470 BA/SN® isocyanate (available from Bayer) was added over 1.6 hours. Then the mixture was heated at 90° C. for an additional 4.3 hours. At this time, a small amount of isocyanate remained (according to an infrared analysis), so 10 g of n-butanol was added. This addition removed the remaining isocyanate present. The theoretical solids was 76%.

Example 29

This example illustrates the cure of the urethane of Example 28, and compares it to a polyether of 3,4-epoxy-1-butene. The product of Example 28 (10 g) was blended with 0.2 g of Cobalt Hydrocure II® and 0.4 g of Calcium Hydrocem® and 5 g of MEK solvent. It was drawn down with a draw bar with a gap of 200 micrometers. The coating was flash dried for 30 minutes to remove excess solvent. The film was baked at 100° C. for 1 hour. The film properties were compared with similar film produced from a blend of the polyether of Example 7 (5.39 g) and 0.11 g Cobalt Hydrocure II® and 0.22 g of Calcium Hydrocem®, and 1 g of MEK solvent. Table 9 below compares the film properties. This example illustrates that this urethane containing far fewer unsaturated groups per molecule than the polyether cures more slowly and is much slower to develop useful properties.

TABLE 9

| Material Type | Film thickness (micrometers) | MEK double rubs | Postbaked Film Comments |
|---|---|---|---|
| Urethane of Example 23 | 0.65 | 5 | soft |
| Example 7 Polyether | 0.87 | 250 | Hard film. MEK double rub failure at bubbles only, significant marring |

Example 30

This example illustrates the co-cure of an EpB polyether alcohol with acrylate functional oligomers. Catalyzed oligomers: The polyether of Example 7 was blended with 2% Cobalt Hydrocure II® and 4% Calcium Hydrocem® to form a catalyzed oligomer. The commercial poly(allyl glycidyl ether) Santolink XI-100® was also blended with the same levels of these two catalysts. These were blended with acrylate functional oligomers according to Table 10 below.

TABLE 10

| | Sample | | | | | | | | | |
|---|---|---|---|---|---|---|---|---|---|---|
| Material | A | B | C | D | E | F | G | H | I | J |
| | Grams of each Ingredient | | | | | | | | | |
| Example 7 Polyether* | 10 | 8 | 5 | 2 | 5 | 5 | | | | |
| Trimethylolpropane Triacrylate (TMPTA) | | 2 | 5 | 8 | | | | 2 | 5 | 8 |
| SR-415 ® Ethoxylated TMP Triacrylate Esters^ | | | | | 5 | | | | | |
| Catalyzed Santolink XI-100 ® poly(allyl glycidyl ether)* | | | | | | 5 | 10 | 8 | 5 | 2 |

*Catalyzed with 0.1% cobalt and 0.2% calcium using Cobalt Hydrocure II ® (5% Co) and Calcium Hydrocem ® (5% Ca)
^Available from Sartomer Co., Inc., Exton, PA The samples were stirred to thoroughly blend the ingredients and then drawn down to form a 50 micrometer film on Bonderite 1000 steel 4×8 inch panels. The following observations were made for each film when treated as noted in Tables 11 and 12 below. A conclusion was drawn that 1:1 mixtures of TMPTA with EpB polyether alcohol is superior for solvent resistance and inhibiting rust on steel.

TABLE 11

| Sample | Cure Overnight at RT Film Appearance | Day 7 RT Cure MEK Double Rubs* | 24 Hour Salt Fog Results |
|---|---|---|---|
| A | wet | 5 | severe rust, peeling |
| B | wet | 95 | moderate rust all over surface |
| C | wet | 100+ | slight scribe creep, no face rust |
| D | wet | 14 | severe rust, peeling |
| E | wet | 22 | severe rust, peeling |
| F | slight tack | 100+ | severe rust, peeling |
| G | Dry, orange peel | 100+ | severe rust, peeling |
| H | Dry, orange peel | 100+ | moderate rust all over surface |
| I | wet | 100+ | no scribe creep, 2 spots on surface |
| J | wet | 12 | severe rust, peeling |

*Rubbed the film back and forth with cheese cloth wetted with MEK at constant pressure.

TABLE 12

| Sample | Bake 1 hour at 100° C. Film Appearance | MEK Double Rubs* |
|---|---|---|
| A | Some yellowing and cracking | 100+ |
| B | Slight yellowing, pin holes | 100+ |
| C | Slight yellowing, pin holes | 100+ |
| D | slight yellowing, some dewetting | 100+ |
| E | Some cracking | 77 |
| F | Some cracking | 28 |
| G | Many small cracks | 75 |
| H | Orange peel | 100+ |
| I | Pin holes, slight cracking | 100+ |
| J | Much dewetting | 23 |

Example 31

Comparison of Santolink XI-100® with the polyether of Example 7 in a catalyzed co-cure with trimethylol propane triacrylate (TMPTA). The following catalyzed solutions were prepared:

A. In a jar were blended 25 grams of the polyether of Example 7 and 0.5 grams Cobalt Hydrocure II® and 1.0 gram of Calcium Hydrocem®.

B. In a jar were blended 25 grams of Santolink XI-100 and 0.5 grams Cobalt Hydrocure II® and 1.0 gram of Calcium Hydrocem®.

From these the following blends were prepared:

C. In a vial were blended 10.0 grams of A above and 10 grams TMPTA.

D. In a vial were blended 10.0 grams of B above and 10 grams TMPTA

Drawdowns were made with a 75 micrometer drawbar on flat glass panels. The panels were then air dried or baked at 100° C. for 1 hour according to Table 13 below. The Tukon hardness measured on both baked and air dried films, illustrates the much harder films produced using the polyether of Example 7 compared to the commercial Santolink XI-100® poly(allyl glycidyl ether).

TABLE 13

| Coating Blend | Baked Panel Tukon Hardness | 7 Day RT Tukon Hardness | 17 Day RT Tukon Hardness |
|---|---|---|---|
| C | 20.5 | 9.5 | 16 |
| D | 1.6 | 1.6 | |
| D' | 4 | 2.2 | 3 |

Note: Sample D' contains 0.03 g of fluorocarbon surfactant FC-431 ® (available from 3M Corp.)

Example 32

This example illustrates the combination of an AAEM functional acrylic latex with a polyether oligomer of 3,4- epoxy-butene-1 and oxidatively curing the combined resins in the form of a film.

Cure of AAEM latex films at elevated temperature (150° C./30 min) was evaluated with and without the presence of 3,4-epoxy-1-butene polyether-metal drier blend. The films were prepared with a 3-mil drawbar on 4×8 inch Bonderite® 1000 treated steel panels (available from Q-Panel Lab Products). The cure of the latex is enhanced by the addition of the EpB polyether alcohol blend as may be seen from the acetone double rubs in Table 14 below.

TABLE 14

| Identity of Film Components* | Solids of Formula | Film Acetone Double Rubs | Comments for Baked Films |
|---|---|---|---|
| 1. Polyether^ blend | 33.2 | 200+ | Excellent curing, no marring of film |
| 2. AAEM Latex with NH3 | 38.8 | 3 | Jagged edges at acetone failure site |
| 3. Polyether^ blend + AAEM Latex (29:71 solids basis) with NH3 | 44.2 | 10 | Light brown |
| 4. Polyether^ blend + AAEM Latex (55:45 solids basis) with NH3 | 47.3 | 170 | Light brown |

*All film components containing latex included (based on the latex solids) 2% Tergitol NP-40 ® surfactant (nonylphenol polyethylene glycol ether having an HLB of 17.8), and 4% butoxyethanol (EB) and 8% Texanol ® (Ester Alcohol) coalescing solvents. The latex composition used had the following percent monomer composition: 43/40/2/15 BA/MMA/MAA/AAEM[a], respectively. It was prepared by the following procedure.
The polyether blend was a mixture of 5.6% of the reaction product of Carbowax ® PEG 900 polyethylene glycol (available from Union Carbide) and 10 moles of 3,4-epoxy-butene-1 with 94.4% of the butanediol initiated 10 mole 3,4-epoxy-butene-1 adduct. This polyether blend, in all experiments, was catalyzed with 0.15% Co and 0.3% Ca (present as Cobalt Hydrocure II ® and Calcium Hydrocem ® , respectively) available from OMG Americas). The samples with latex alone had no cobalt or calcium catalysts present.

A glass reactor containing a mechanical stirrer, nitrogen atmosphere, thermocouple was charged with, 12.61 g AQ-55®[b] polyester (32.26% aqueous dispersion) and 892.9 g deionized water. The reactor contents were heated to 85° C., then a solution of 4.07 g ammonium persulfate, 4.52 g Dowfax® 2A1[c], and 68.04 g deionized water was pumped in at the rate of 0.28 g/min. Simultaneously, a solution of 349.9 g BA, 325.5 g MMA, 16.28 g MAA, 122.1 g AAEM and 4.07 2-ethylhexyl-3-mercaptopropionate was pumped in at a rate of 3.03 g/minute. After the feeds were completed, the reaction was held at temperature for 45 minutes, then cooled and filtered. The resulting latex had a solids content of 45.0%, a pH of 2.6, and a particle size of 120 nm. Ammonia was added to the latex to neutralize all of the acid stoichiometrically and to react with 75% of the AAEM content.

[a]AAEM (acetoacetoxyethyl methacrylate) monomer available from Eastman Chemical Co.
[b]AQ-55 is a water dispersible polyester available from Eastman Chemical Co.
[c]Dowfax 2A1 is a surfactant available from Dow Chemical Co.

The cure of the films of the combined resins (latex and polyether) was measured by resistance to solvent rubs. The cured film was rubbed back and forth (one double rub) at constant pressure with a gloved finger covered with a rag wet with solvent. The number of double rubs is recorded when the film breaks through to the substrate.

Example 33

Preparation of Unsaturated Polyester Resin

To a three-neck, round-bottom flask equipped with a mechanical stirrer, a steam-jacketed partial condenser, a Dean-Stark trap, a nitrogen inlet, and a water condenser were charged 1,2-propanediol, 221.5 g (2.91 mole); di(ethylene glycol), 92.7 g (0.87 mole); fumaric acid, 342.2 g (2.95 mole); and Fascat 4100® (Atochem), 0.66 g. The mixture was allowed to react at 150–160° C. until 100 g of the condensate (water) was obtained. The acid number was determined to be 42.1 mg KOH/g. The resulting resin was then isolated neat.

Example 34

This example illustrates the co-cure of a polyether of 3,4-epoxy-1-butene with an unsaturated polyester. A solution (A) was made by blending the following ingredients:

23.38 g of the unsaturated polyester of Example 33
9.54 g of the polyether of Example 7
7.41 g toluene
7.83 g MEK The catalyzed blends shown in Table 15 below were made as follows by combining catalysts with the above unsaturated polyester/polyether blend:

TABLE 15

| Composition | Grams of Blend Above | Grams Cobalt Hydrocure II | Grams Calcium Hydrocem |
|---|---|---|---|
| B | 10.02 | 0.137 | 0.273 |
| C | 10.02 | 0.033 | 0.064 |

Both solutions were drawn down as films on Bonderite 1000 treated steel panels using a 75-micrometer draw bar. The films were allowed to dry 3 days at room temperature. The observed film results are recorded in Table 16 below:

TABLE 16

| Film Composition | Comments |
|---|---|
| A | Film is still wet |
| B | tack free film |
| C | film is tacky |

Thus, the catalyzed composition forms a better film than the uncatalyzed composition.

Example 35

In a similar experiment to that above, using the same polyester composition and substituting the polyether of Example 10 for the polyether of Example 7, baked films (100° C./1 hour) were produced with excellent solvent resistance. The data is shown in Table 17 below.

TABLE 17

| Grams of Composition of Example 10 | Grams of Cobalt Hexcem* | Grams of Unsaturated Polyester of Example 17 | Baked Panel Film Appearance | Acetone Double Rubs |
|---|---|---|---|---|
| 1.00 | 0.048 | 3.99 | Flat appearance. Dry, hard | 100+ |
| 3.03 | 0.030 | 0 | Moderate gloss. Dry, hard | 100+ |

*Cobalt Hexcem ® is a catalyst containing 12% Co available from OMG Americas.

The films that were rubbed with the acetone soaked rag had no solvent marring. Thus, even though the polyester was the major part of the coating film composition, when catalyzed with cobalt, the composition cures to form a film with excellent solvent resistance properties.

Example 36

This example illustrates the cure of a block copolymer of ethylene oxide and 3,4-epoxy-1-butene, a tri-hydroxy functional polyether and an isopropanol initiated EpB polyether alcohol. The polyether containing polyethylene glycol 400 of Example 9 (5.0 g) was blended with 0.103 g of Cobalt Hydrocure II® and 0.203 g of Calcium Hydrocem® and 0.468 g of MEK. The light blue solution was drawn down on both a steel substrate coated with Bonderite 1000 pretreatment and a flat glass substrate with a drawbar designed to produce a 75 micrometer thick film. The coating on the steel panel was first dried at ambient temperature for 30 minutes to remove solvents, then baked at 100° C. for 1 hour. The glass panel was dried at ambient temperature for 7 days. A similar catalyzed film was produced from a trimethylol propane initiated polyether of 3,4-epoxy-1-butene (1:9.3 mole ratio) having a molecular weight (Mw) of 1150. A similar catalyzed film was produced from the isopropanol initiated polyether of Example 11. The cured film results are illustrated in Table 18 below.

TABLE 18

| Resin Initiator Description | Mw | After Bake Film Appearance on Steel Panel | 100° C./1 hr Baked Steel Panel Acetone Double Rubs | RT Cured Glass Panel | |
|---|---|---|---|---|---|
| | | | | 2 Day Evaluation Comments | 7 Day Evaluation Comments |
| PEG 400 | 1592 | Low gloss | 40 | Wet | Slight tack |
| TMP | 1150 | Better gloss | 100+ | Slight tack | Hard. Mars easily |
| i-PrOH | 1128 | High gloss-Stress crack | 100+ | Wet | Slight tack |

The invention has been described in detail with particular reference to preferred embodiments thereof, but it will be understood that variations and modifications will be effected within the spirit and scope of the invention.

What is claimed is:

1. An oxidatively curable coating composition comprising:
   (a) about 5–100 weight % of an oxidatively curable polyether alcohol or derivative thereof which comprises a product of the following reactants
      (i) 3,4-epoxy-1-butene and
      (ii) an initiator selected from the group consisting of water and an alcohol,
   wherein the polyether alcohol comprises n units of residue (I) and m units of residue (II), the total value of (n+m) is about 1 to 70, n/(n+m) is a value in the range of about 0.70 to 1.00, and residues (I) and (II) have the structures:

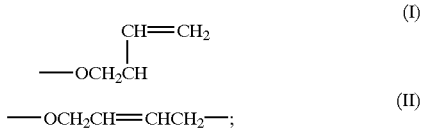

(b) about 0–95 weight % of a curable resin;
   (c) about 0–40 weight % of an organic solvent; and
   (d) a catalytic amount of a metal drier.

2. The composition of claim 1, wherein the molar ratio of (i)/(ii) in the polyether alcohol is about 1–70.

3. The composition of claim 2, wherein the molar ratio of (i)/(ii) in the polyether alcohol is about 2–60.

4. The composition of claim 3, wherein the molar ratio of (i)/(ii) in the polyether alcohol is about 5–30.

5. The composition of claim 1, wherein the alcohol (ii) is selected from monohydric alcohols and polyhydric alcohols.

6. The composition of claim 1, wherein the total value of about n+m is 2 to 70, n/(n+m) is a value in the range of about 0.70 to 0.95.

7. The composition of claim 5, wherein the monohydric alcohol is selected from the group consisting of methanol, 1-butanol, 2-ethylhexanol, and isopropyl alcohol, and the polyhydric alcohol is selected from the group consisting of ethylene glycol, polyethylene glycol, methoxypolyethylene glycol, 2-butene-1,4-diol, trimethylolpropane, and 1,4-butanediol.

8. The composition of claim 1, wherein the reaction between the 3,4-epoxy-1-butene (i) and the initiator (ii) is catalyzed by an acid or a base catalyst.

9. The composition of claim 1, which consists essentially of the polyether alcohol (a) and the metal drier (d).

10. The composition of claim 1, wherein the curable resin (b) is present in an amount of about 25–80 weight %.

11. The composition of claim 10, wherein the curable resin (b) is present in an amount of about 50–80 weight %.

12. The composition of claim 1, wherein the curable resin (b) is present in an amount of about 0–15 weight %.

13. The composition of claim 1 comprising from about 0–20 weight % organic solvent (c).

14. The composition of claim 1 wherein the curable resin (b) contains carbon-carbon unsaturation.

15. The composition of claim 14, wherein the curable resin (b) is selected from the group consisting of acrylamide resins, alkyd resins, epoxy resins, urethane resins, polyester resins, modified polyester resins, acrylate functional oligomers and polymers, acrylic latex resins and resins containing maleate, fumarate, and itaconate ester and acid ester functional groups.

16. The composition of claim 1, wherein the organic solvent is selected from the group consisting of hydrocarbons, chlorinated hydrocarbons, cyclic or acyclic ethers, alcohols and, esters.

17. The composition of claim 1, wherein the metal drier (d) is a metal carboxylate.

18. The composition of claim 17 wherein the metal is selected from the group consisting of cobalt, zirconium, calcium, manganese, a rare earth metal, aluminum, zinc, iron and mixtures thereof.

19. The composition of claim 1, wherein the polyether alcohol (a) is further reacted with a low molecular weight compound selected from the group consisting of an isocyanate, a diester, a diacid and a diepoxide prior to combining it with the curable resin (b), the organic solvent (c) and the metal drier (d).

20. A polyether alcohol which comprises a product of the following reactants:
(i) 3,4-epoxy-1-butene;
(ii) a saturated oxirane compound; and
(iii) an initiator selected from the group consisting of water and an alcohol,
wherein the polyether alcohol comprises n units of residue (I) and m units of residue (II), the total value of n+m is about 2 to 70, n/(n+m) is a value in the range of about 0.70 to 0.95, and residues (I) and (II) have the structures:

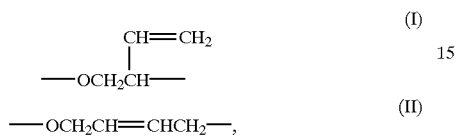

with the proviso that the reactants do not include an alk-1-enyloxy oxirane.

21. The polyether alcohol of claim 20, wherein the polyether alcohol is a random or block copolymer of the 3,4-epoxy-1-butene, and the saturated oxirane.

22. The polyether alcohol of claim 21, wherein the saturated oxirane compound is selected from the group consisting of ethylene oxide, propylene oxide, butylene oxide, styrene oxide and glycidyl ethers.

23. The polyether alcohol of claim 22, which is a block copolymer of 3,4-epoxy-1-butene and ethylene oxide.

24. A composition comprising the block copolymer of claim 23 and water.

25. The polyether alcohol of claim 20, wherein the molar ratio of (ii)/(i) is about 0.05–10 and the molar ratio of (i)+(ii)/(iii) is about 1–30.

26. A polyether alcohol which is a block copolymer which comprises a product of the following reactants:
(i) 3,4-epoxy-1-butene;
(ii) ethylene oxide; and
(iii) an initiator selected from the group consisting of water and an alcohol,
wherein the polyether alcohol comprises n units of residue (I) and m units of residue (II), the total value of n+m is about 1 to 70, n/(n+m) is a value in the range of about 0.70 to 1.00, and residues (I) and (II) have the structures:

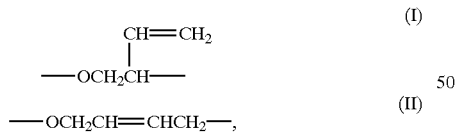

with the proviso that the reactants do not include an alk-1-enyloxy oxirane.

27. A composition comprising the block copolymer of claim 26 and water.

28. An oxidatively curable coating composition comprising:

(a) about 5–100 weight % of an oxidatively curable polyether alcohol or derivative thereof which comprises a product of the following reactants
(i) 3,4-epoxy-1-butene
(ii) a saturated oxirane compound and
(iii) an initiator selected from the group consisting of water and an alcohol,
wherein the polyether alcohol comprises n units of residue (I) and m units of residue (II), the total value of (n+m) is about 1 to 70, n/(n+m) is a value in the range of about 0.70 to 1.00, and residues (I) and (II) have the structures:

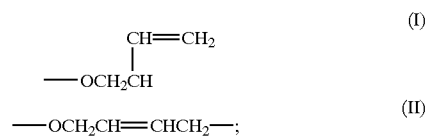

(b) about 0–95 weight % of a curable resin;
(c) about 0–40 weight % of an organic solvent; and
(d) a catalytic amount of a metal drier.

29. The composition of claim 28, wherein the curable resin is present in an amount of about 25–80 weight %.

30. The composition of claim 29, wherein the curable resin (b) contains carbon-carbon unsaturation.

31. The composition of claim 28, wherein the curable resin (b) is selected from the group consisting of acrylamide resins, alkyd resins, epoxy resins, urethane resins, polyester resins, modified polyester resins, acrylate functional oligomers and polymers, acrylic latex resins and resins containing maleate, fumarate, and itaconate ester and acid ester functional groups.

32. The composition of claim 28, wherein the saturated oxirane compound is selected from the group consisting of ethylene oxide, propylene oxide, butylene oxide, styrene oxide and glycidyl ethers.

33. The composition of claim 28, wherein the polyether alcohol (a) is further reacted with a low molecular weight compound selected from the group consisting of an isocyanate, a diester, a diacid and a diepoxide prior to combining it with the curable resin (b), the organic solvent (c) and the metal drier (d).

34. An oxidatively cured film of the coating composition of claim 1.

35. An oxidatively cured film of the coating composition of claim 28.

36. A composition comprising:
(a) a polyether alcohol of claim 20,
(b) a surfactant; and
(c) water.

37. The composition of claim 36, wherein the surfactant is a block copolymer of 3,4-epoxy-1-butene and ethylene oxide.

38. The composition of claim 37, which is in the form of an emulsion.

* * * * *